Patented Mar. 19, 1929.

1,706,055

UNITED STATES PATENT OFFICE.

CLARK W. DAVIS, OF SWARTHMORE, PENNSYLVANIA, ASSIGNOR TO E. I. DU PONT DE NEMOURS & COMPANY, OF WILMINGTON, DELAWARE, A CORPORATION OF DELAWARE.

PROCESS OF OXIDIZING AMMONIA.

No Drawing.   Application filed February 18, 1928.   Serial No. 255,503.

This invention relates to a process for oxidizing ammonia to form oxides of nitrogen and more particularly it relates to an improved catalyst for carrying out such processes.

By incorporating substantial amounts of rhodium with platinum in the form of an alloy, I have discovered that it is possible to operate the catalyst at much higher temperatures than are practical with platinum per se, obtain less loss of catalyst at these higher temperatures and furthermore obtain higher conversions of ammonia than those obtained with platinum, per se. The improved properties of the new catalyst depend to some extent upon the amount of rhodium alloyed with the platinum, and I have found that it is necessary, in order to get good results, for there to be at least 2% by weight of rhodium in the alloy.

Thus, in accordance with this invention the improved process for oxidizing ammonia to oxides of nitrogen by passing a mixture of ammonia and oxygen-containing gas into contact with a catalyst at an elevated temperature is characterized in this that the catalyst is formed of an alloy of platinum and rhodium containing at least 2% by weight of rhodium. The alloy in accordance with this invention may of course, comprise larger quantities of rhodium, for instance, the alloy may comprise as high as 50% rhodium or even higher, but the higher percentages of rhodium while being beneficial are not so suitable for working into catalytic form due to the resulting hardness and brittle quality of such an alloy.

An object of this invention is the production of a catalyst capable of operating at high temperatures.

A further object of the invention is the production of a catalyst composed of an alloy capable of lowering the amount of loss of the catalyst at operating temperatures.

A still further object of the invention is to increase the amount of ammonia converted at any given temperature above that obtained with essentially pure platinum in ammonia oxidation.

Other objects will appear as the description proceeds.

By incorporating larger amounts of other metals with platinum, I have discovered that it is possible to operate the catalyst at much higher temperatures than are practical with platinum, obtain equal or even less loss of catalyst at this higher temperature and, furthermore, obtain higher conversions than platinum will yield.

The alloy that I have found to be superior to platinum consists essentially of platinum and rhodium. The presence of rhodium in appreciable quantities, not only tends to lower the amounts of catalyst lost at operating temperatures, but also increases the amount of ammonia that is converted at any given temperature above that obtained with essentially pure platinum. This alloy may comprise as low as 2% and as high as 50% rhodium, or even higher. The higher percentages of rhodium have been found beneficial, but the hardness and brittleness of the alloy make it unsuitable for working into catalytic form. It will be understood, of course, that this invention applies not only to alloys of platinum and rhodium but to an alloy of platinum with any other metal or metals, the alloy having a sufficiently high fusing point to give such beneficial results, of increasing the amount of ammonia converted and lowering the catalyst loss.

In carrying out my invention, I prefer to use a gauze woven from wire .003 inch in diameter, having 80 meshes per inch, and consisting of four layers as close together as possible; preferably welded together provided the meshes are not destroyed. This gauze can be used as four flat layers as is the practice with the United Alkali Company's converter as described in J. Soc. Chem. Ind. 41-43 T (1922) or as a cylindrical gauze such as is used in the Parsons-Jones converter disclosed in U. S. Patent 1,321,376. The shape, form or design of the converter has no effect on the efficiency provided the gauze temperature can be maintained. In order to obtain efficiencies of 90% and above, it is necessary to preheat either the ammonia air mixture or preheat the air before the ammonia and air are mixed, or supply electrical or other heat from an outside source. With a 10% by volume ammonia air mixture and a conversion of 100%, the theoretical temperature rise of the catalyst, due to the heat of reaction, is approximately 720° C.; consequently, in order to obtain catalyst temperatures of approximately 1020° C., it would be necessary to supply, in the form of preheat, 300° C. so as to get the desired catalyst temperature. Practically, it is necessary to supply a little additional heat to compensate for losses.

The magnitude of conversion with either a platinum gauze or a platinum alloy gauze seems to depend on the catalyst temperature instead of the type of converter used. If the catalyst is maintained at the same temperature in two differently designed converters and the ammonia rating kept comparable, the conversions are usually identical.

In carrying out my process I may oxidize the ammonia at atmospheric pressure or I may operate the process at pressures substantially above atmospheric pressure. The latter process is described by Maxted in his British Patent 127,845. There is a great advantage in operating such a process above atmospheric pressure, because the volume of the apparatus is greatly reduced, due primarily to the increase in rate of oxidation of NO to $NO_2$ under increased pressure. In operating under increased pressure, it is necessary to use an ammonia-air mixture under 10% by volume, since such mixtures support combustion more readily under pressure.

I have also found that my process may be operated at decreased pressures, that is, pressures less than atmospheric, but I preferably operate at pressures in the range of 15 to 200 pounds.

The following example is given by way of illustration as one embodiment of my invention but is is to be understood, of course, that the invention is not to be limited thereby.

Burning 100 pounds of ammonia per ounce of catalyst per twenty-four hours as a 9.5% by volume mixture, the conversions at approximately 1000° C. catalyst temperature with essentially pure platinum are approximately 6% higher at atmospheric pressure than when running under 100 pound gauge pressure. Under the same conditions, a catalyst containing approximately 90% platinum and 10% rhodium gives substantially higher conversions both at atmospheric and increased pressures. The loss of catalyst increases very rapidly as the temperature is increased above approximately 850° C., but when 90% platinum-10% rhodium gauze is used, the loss at operating temperature is approximately one-half that of essentially pure platinum. In operating I prefer to use temperatures of 850° to 1200° C.

A further advantage in the use of rhodium in this connection lies in the fact that the platinum-rhodium alloy has a somewhat lower density and somewhat higher melting point than platinum alone. Also rhodium has a much lower density than platinum which decreases the weight of the catalyst to be used without materially increasing the cost. Rhodium also has a much lower rate of volatilization at increased temperatures. A further advantage lies in the fact that rhodium has a higher melting point which reduces the rate of loss of the catalyst. A still further advantage is in the strength of the gauze catalyst and in the fact that it tends to crystallize less readily, and in prolonged heating of the catalyst the rate of growth of the crystals is retarded, and the size of the crystals is much smaller in the case of platinum-rhodium alloy than with platinum.

Although I have referred to the catalyst as being in the form of a wire gauze, it will be understood, of course, that the catalyst may take any other form of the type customarily employed in ammonia oxidation.

As many apparently widely different embodiments of this invention may be made without departing from the spirit thereof, it is to be understood that I do not intend to limit myself to the specific embodiments thereof except as indicated in the appended claims.

I claim:

1. A process for oxidizing ammonia to nitric oxide which comprises passing a mixture of ammonia and oxygen containing gas through a catalyst comprising a platinum alloy containing from 2% to 50% by weight of rhodium.

2. A process for oxidizing ammonia to nitric oxide which comprises passing a mixture of ammonia and oxygen containing gas through a catalyst comprising a platinum alloy containing from 5% to 25% by weight of rhodium.

3. The process of oxidizing ammonia to nitric oxide by means of a catalyst containing platinum which comprises diminishing the amount of the loss of the catalyst at temperatures of 850° C. to 1200° C., by incorporating more than 2% by weight rhodium therewith, thereby increasing the amount of ammonia that is converted.

4. The process of oxidizing ammonia to nitric oxide by means of a catalyst which comprises diminishing the amount of the loss of the catalyst at temperatures of 850° C. to 1200° C., and gauge pressures of 15 to 200 pounds per square inch, by incorporating 2% to 50% rhodium therewith, thereby increasing the amount of ammonia that is converted.

5. In a process of oxidizing ammonia with an oxygen containing gas by the aid of a catalyst containing platinum, the improvement characterized by employing a catalytic alloy containing over 2% by weight of rhodium.

6. In a process of oxidizing ammonia with an oxygen containing gas by the aid of a catalyst containing platinum, the improvement characterized by employing a catalytic alloy containing over 10% by weight of rhodium.

In testimony whereof, I affix my signature.

CLARK W. DAVIS.

CERTIFICATE OF CORRECTION.

Patent No. 1,706,055.             Granted March 19, 1929, to

CLARK W. DAVIS.

It is hereby certified that error appears in the printed specification of the above numbered patent requiring correction as follows: Page 1, line 6, beginning with the word "By" strike out all to and including the word "alloy" in line 37, and insert instead "It has been known for many years that when a mixture of ammonia and air is brought into contact with a catalyst such as platinum, at a red heat, the ammonia is oxidized forming oxides of nitrogen, water and nitrogen.

Platinum, as a catalyst for this reaction, was discovered in 1839 by Kuhlmann. This metal has been used for a catalyst during the existence of this process in a specially refined state. Landis investigated the effect of various impurities in platinum on the conversion of ammonia and found iridium to be deleterious. This work led to his patent U. S. 1,193,799, which claims the use of iridium free platinum. The analyses of the platinum gauzes used at Muscle Shoals nitrate plant are given by Perley, J. Ind. Eng. Chem. vol. 12 (1920) page 10. The impurites shown vary from .05% to 1.8%, which it is believed must be taken into consideration as impurities which are likely to occur in platinum. To secure high efficiency of conversion, it is necessary to maintain the contact agent at temperatures in excess of 700 degrees C. At temperatures above 850 degrees C. the loss of platinum becomes more rapid but still the higher the temperature the higher is the conversion of ammonia to nitric oxide."; same page, line 52, beginning with the word "By" strike out all to and through the word "loss" line 81, and insert instead "By incorporating substantial amounts of rhodium with platinum in the form of an alloy, I have discovered that it is possible to operate the catalyst at much higher temperatures than are practical with platinum per se, obtain less loss of catalyst at these higher temperatures and furthermore obtain higher conversions of ammonia than those obtained with platinum, per se. The improved properties of the new catalyst depend to some extent upon the amount of rhodium alloyed with the platinum, and I have found that it is necessary, in order to get good results, for there to be at least 2% by weight of rhodium in the alloy. Thus, in accordance with this invention the improved process for oxidizing ammonia to oxides of nitrogen by passing a mixture of ammonia and oxygen-containing gas into contact with a catalyst at an elevated temperature is characterized in this that the catalyst is formed of an alloy of platinum and rhodium containing at least 2% by weight of rhodium. The alloy in accordance with this invention may of course, comprise larger quantities of rhodium, for instance, the alloy may comprise as high as 50% rhodium or even higher, but the higher percentages of rhodium while being beneficial are not so suitable for working into catalytic form due to the resulting hardness and brittle quality of such an alloy."; page 2, line 35, for the word "is" first occurrence, read "it"; same page, line 106, claim 3, before the word "rhodium" insert the word "of"; page 2, line 115, claim 4, before the word "rhodium" insert the words "by weight of"; and that the said Letters Patent should be read with these corrections therein that the same may conform to the record of the case in the Patent Office.

Signed and sealed this 28th day of May, A. D. 1929

(Seal)                                                                M. J. Moore,
Acting Commissioner of Patents.